CORNELIUS & WILHELM.
Spiral Tube.

No. 6,603.

Patented July 24, 1849.

UNITED STATES PATENT OFFICE.

ROBERT CORNELIUS AND CHARLES WILHELM, OF PHILADELPHIA, PENNSYLVANIA, ASSIGNORS TO CORNELIUS AND BAKER.

MAKING ELEVATOR-TUBES FOR LAMP-WICKS.

Specification of Letters Patent No. 6,603, dated July 24, 1849.

*To all whom it may concern:*

Be it known that we, ROBERT CORNELIUS and CHARLES WILHELM, of the city and county of Philadelphia and State of Pennsylvania, have invented a new and useful Improvement in Spiral Tubes; and we do hereby declare the following to be a full, clear, and exact description thereof, reference being had to the accompanying drawings, which make a part of this specification.

Our invention has for its primary object the formation of tubes requiring different thicknesses of metal in different parts of the tube, or to have a spiral groove traversing either the interior or the exterior of the tube. Such are the conditions required for example in the tubes which serve to elevate the tubular wicks of Argand lamps. We do not however confine ourselves to the manufacture of tubes for any one purpose but apply the invention to tubes having no offsets or grooves.

The manner in which we form tubes is to make use of thin sheets or laminæ of metal or other suitable materials, which we cut into strips or ribbons of such breadth that they can readily be wound around a cylindrical core or mandrel the edges forming a spiral with an inclination more or less acute according as the strip is broader or narrower with respect to the diameter of the core. The core may be either cylindrical, conical or of any other desired shape, provided it have a finger allowing it to be drawn from the tube when the latter has been completed.

Figure 1:
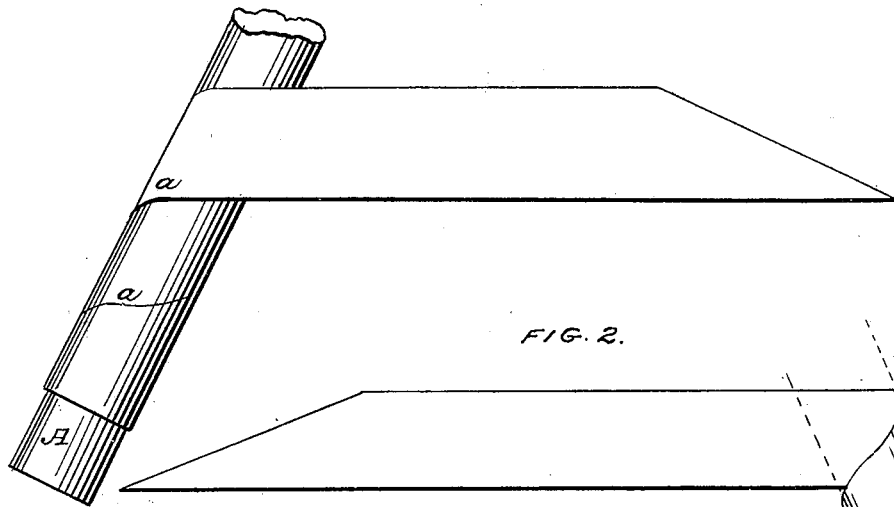
Figure 2:
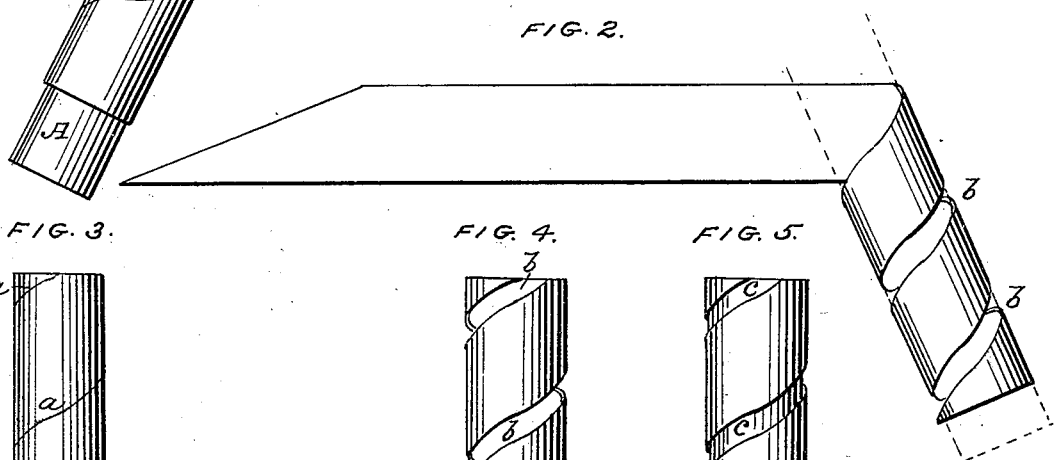
Figure 3:
Figure 4:
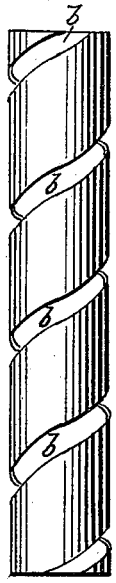
Figure 5:
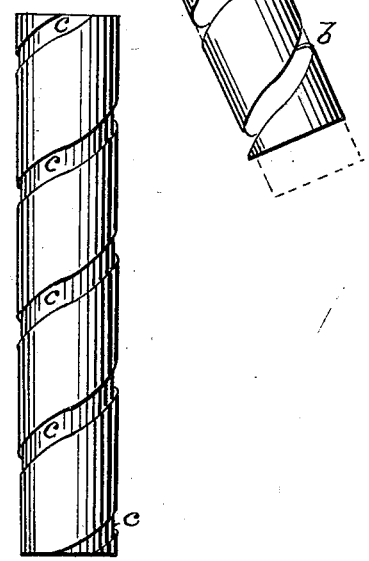

Figure 1, represents the manner in which we form continuous tubes, bringing the edges into contact with each other as the strip is rolled up around a mandrel or core A. Fig. 2 represents the manner of rolling the strip around the mandrel (represented by dotted lines) with the edges at a distance from each other in such manner as to form a spiral groove or slot throughout the extent of the tube. Fig. 3 shows a tube with square ends formed by the sloping off, near its ends, of the strip of metal as seen in Fig. 1. Fig. 4 exhibits a completed spiral groove tube formed after the manner shown in Fig. 2 with the ends also sloped off in a proper angle. Fig. 5 is a tube for elevating lamp wicks, formed by inserting a closed tube Fig. 3, within an open or spiral-grooved tube Fig. 4, which has been formed on a larger mandrel.

The manner in which we unite the tube Fig. 4 with the tube Fig. 3, is by inserting the latter within the former in such manner that the spiral line of juncture $a, a, a, a,$ shall in no part come opposite to the spiral slot $b, b, b, b,$ but that the two shall break joints with each other through their whole extent. The two tubes may then be permanently united, either by dipping them into melted solder or by passing the soldering tool along the whole length of the groove $c, c, c, c,$ Fig. 5, in either of which ways a perfect juncture is effected. Tubes of any desired length may be formed in the manner above described and will possess the advantage of a freedom from lapped or folded joints along the sides.

The interior or ungrooved tube of the wick elevator may be formed in the usual mode of constructing metallic tubes by bringing the opposite edges to meet without lapping upon each other. In practice the Argand wick elevator may be advantageously formed from two strips of tinned iron of suitable thickness and then the junctures are formed by means of the solder employed by tinners; but in some cases we shall use copper or brass and then we shall employ brazers' solder and shall in like manner for other metals vary the joining material or cement to suit each case.

In some cases we shall reverse the respective positions of the closed spiral and the open or slotted spiral, putting the latter within the former instead of on the outside, whereby the spiral groove is formed on the inside instead of the outside of the united tube.

To make double or multiple concentric wick elevators we make on the same tube a groove bolt on the interior and on the exterior, both constructed and acting in the manner and for the purposes above described.

The advantage of the lamp wick elevator constructed in the manner herein described is that it combines economy in the manufacture with entire security against the loss of oil, there being no joint of the ungrooved tube opposite to those of the grooved one and great accuracy in the movement of the wick.

What we claim as our invention and desire to secure by Letters Patent is—

The manner of making the elevators of tubular lamp wicks by combining a spiral produced by coiling a band or ribbon of metal into a cylindrical figure, with another band of metal formed into a similar spiral, but so as to leave a spiral slot or opening between its contiguous edges, the one spiral being placed within the other, and the two breaking joints with each other and united to form a tube spirally grooved or screw shaped either within or without, or both within and without at the same time, in the manner and for the purposes herein set forth, not intending to limit ourselves to the exact arrangements herein set forth, but to vary them at pleasure while we attain the same ends by means substantially the same.

Philadelphia, April 25.

ROBERT CORNELIUS.
C. WILHELM.

Witnesses:
B. L. HERKNESS,
W. A. DUFF.